UNITED STATES PATENT OFFICE.

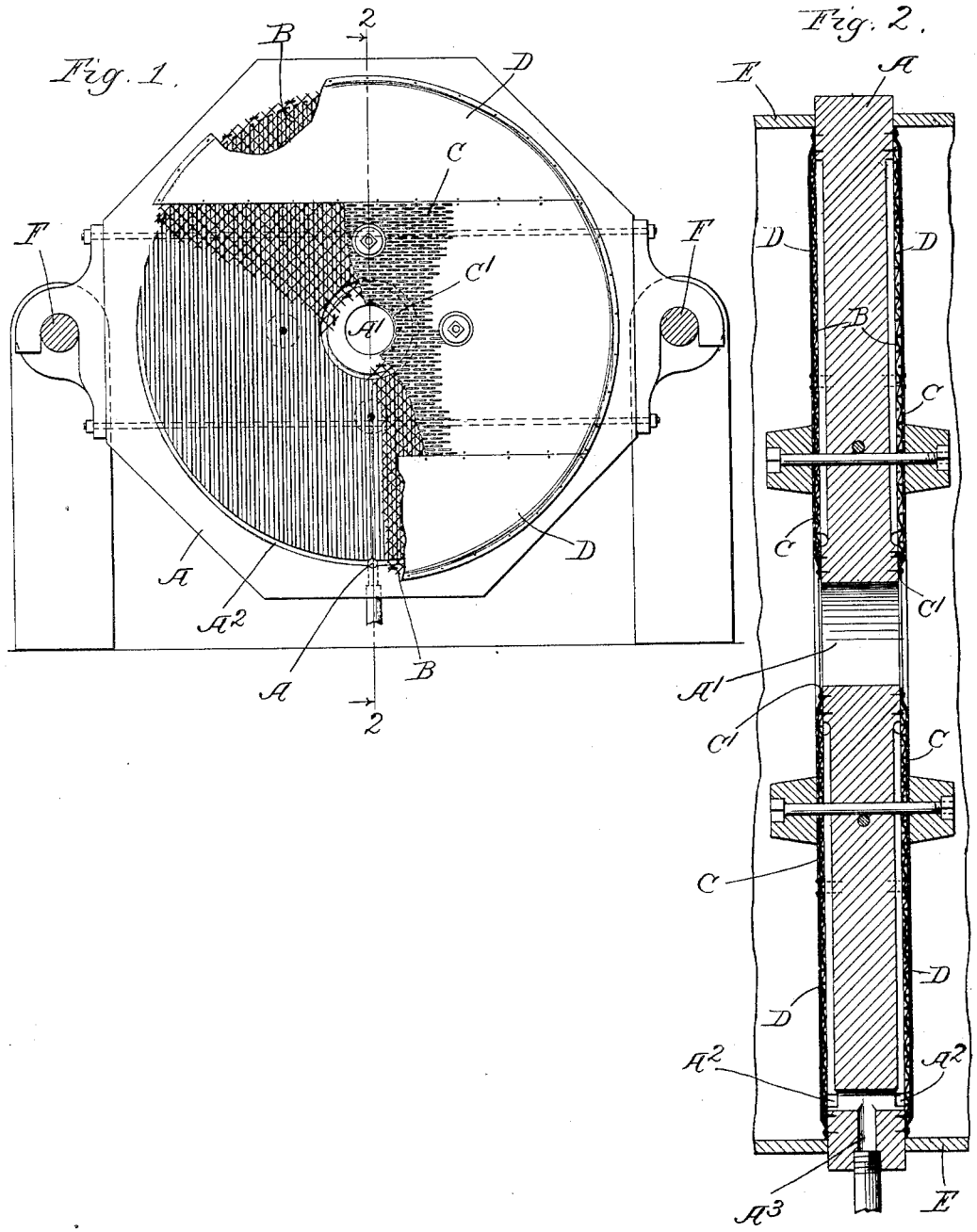

HARRY F. CLEVELAND, OF VINCENNES, INDIANA, ASSIGNOR TO THE TURNEY DRIER COMPANY, OF CHICAGO, ILLINOIS.

FILTER-PRESS PLATE.

SPECIFICATION forming part of Letters Patent No. 675,589, dated June 4, 1901.

Application filed July 13, 1900. Serial No. 23,432. (No model.)

*To all whom it may concern:*

Be it known that I, HARRY F. CLEVELAND, a citizen of the United States, residing at Vincennes, county of Knox, State of Indiana, have invented certain new and useful Improvements in Filter-Press Plates, of which the following is a specification, reference being had to the accompanying drawings, forming a part thereof.

In the drawings, Figure 1 is an elevation of my improved filter-press plate, having a portion of its perforated outer covering broken away, uncovering an open-meshed woven-wire screen underneath the same, and having a portion of said screen broken away, uncovering the grooved central or back element. Fig. 2 is a detail section of the same, upon an enlarged scale, at the line 2 2 on Fig. 1.

In filter-presses of the type employing filtering-plates of the general character of my invention such filtering-plates have hitherto generally been provided with a surface covering or filtering element of woven fabric, (canvas or the like,) such fabric being mounted upon a central or back element having grooves or channels into which the liquid passes when forced through the filtering fabric which covers its surface. Such grooves have suitable drainage-passages by which the liquid is carried off. The woven fabric employed in such presses and as the filtering element of the filter-plates, which forms the walls of the cells, rapidly deteriorates with use, and a large item of the cost of maintaining such presses consists in the cost of replacing such filtering-cloth from time to time. My present invention consists in the substitution of finely-perforated sheet metal for such cloth.

My improved filter-plate comprises a central or back element A, which is preferably a plank, grooved up and down on both surfaces when it is to be used as the intermediate wall between two cells, the grooves being connected at the lower edge or margin of the plate by a cross-channel $A^2$, which leads to a discharge-duct $A^3$, by which the liquid is conducted out of the press. Upon this grooved surface of the plank there is first placed a woven-wire screen B, which is secured by staples or other convenient means. Outside of the woven-wire screen I apply the perforated sheet-metal plate C, which constitutes the filtering element. On account of the greater freedom with which the water passes through this perforated sheet metal than through the filtering-cloth usually employed only a portion of the surface of the grooved plate need be covered by the perforated metal in order to obtain as rapid results as when the entire plate is covered with the filtering fabric. I make the perforated metal plate C, therefore, to constitute only a band or strip across the middle portion of the height of the grooved back element A, covering the remaining portion above and below the perforated plate with imperforate sheet-metal plates D D. The central or back element A has the induction-aperture A' at the center, the drainage grooves or channels being interrupted so that they do not reach said induction-aperture, leaving an ungrooved surface around the margin of the latter. Both the woven-wire screen B and the perforated plate C have a corresponding aperture, that in the woven wire being considerably larger, so that the margin of the aperture does not nearly reach the margin of the aperture A'; but the aperture C' in the perforated plate C is only slightly larger than the aperture A', so that the margin of said aperture C' laps onto the ungrooved surface of the plank A around the aperture A' and is there secured by tacks or in any other convenient manner. Both the perforated plate C and the imperforate plates D D are secured to the plank A at their outer periphery by nails or tacks beyond the ends of the drainage-grooves, and the lateral edges—that is, the upper and lower edges—of the plate C and the abutting edges of the plates D D are similarly secured by tacks taking through the meshes of the woven wire into the ribs between the channels or grooves of the plank A.

The filter-plates of the structure indicated are assembled in cells in the customary manner of construction of presses of this class. The peripheral cell-wall, as shown at E in Fig. 2, seats on the plank A, beyond the periphery of the perforated and imperforate plates C and D, and all the plates of the press are bound together by strain-rods F F in the customary manner.

For the perforated plate C, I prefer to use quite thin metal, and the most efficient operation and the most rapid filtration for a given area may be obtained when the perforations are elongated, as shown in Fig. 1, though I have also employed sheet metal having circular perforations.

The perforated sheet-metal plate C should have its perforations as smoothly cut as possible, avoiding ragged edges, by which solid material might be retained in the perforations, causing them to become entirely closed, for it will be understood that the filtration effected in the use of this plate is not caused primarily by the fact that the apertures in the plate are too small to allow solid matter to pass, but by reason of the accumulation across the apertures, in a manner abridging them, of solid particles sufficiently large to be thus lodged and serve this purpose, such particles of bran or fiber eventually constituting a film which completely bridges the apertures and becomes itself the filtering means through which only the clear liquid can pass, leaving all finer solid matter behind. If the particles instead of being thus lodged across the slots become wedged into them they are eventually closed. When a plate of this construction is first put into use—that is, when the cell is first filled with the matter to be filtered before the accumulation of particles constituting a film over the apertures, as above described, has occurred sufficiently to answer that purpose—the liquor passes through, containing a large portion of solid matter which is desired to extract. It is therefore important to hasten the accumulation of the filtering-film or bridge over the apertures, and for the purpose above stated it is desirable to use elongated apertures or slots rather than round apertures in order to increase the area open for filtration and also because the individual round apertures are more liable to become filled up than the longer ones. If, however, the perforated plate is applied with the elongated apertures having their length up and down, the current of water passing through them with a downward trend tends to slide the particles which might accumulate on the surface of the plate at the entering side down along the apertures, and thus prevent the apertures from being rapidly covered entirely by the film, which would hold back the finer particles and make the filtration perfect. I prefer, therefore, to place the perforated sheet with the elongated apertures extended horizontally, as shown in the drawings.

I claim—

1. A filtering-plate for a filter-press, comprising a back or central element superficially channeled or grooved, and a surface covering for the same constituting the sole filtering element, consisting of sheet metal finely perforated and secured outside the grooved surface of the back or central element, and forming the outer surface of the plate.

2. A filtering-plate for a filter-press, comprising a back or central element superficially channeled or grooved; an open-meshed wire screen applied on the grooved surface of said back element; a perforated sheet-metal plate applied on the screen; and constituting the outer surface and the sole filtering element of the plate and means for binding said elements together.

3. A filtering-plate for a filter-press, comprising a back or central element superficially channeled or grooved, having an aperture for supplying the material to be filtered within the periphery of such channeled or grooved portion; and a surface covering constituting the sole filtering element, consisting of finely-perforated sheet metal applied outside the grooved surface of the back or central element forming the outer surface of the plate, and having an aperture corresponding to the supply-aperture of said grooved element, the grooves of the latter being interrupted so that they do not extend to said central aperture; said perforated sheet-metal element being secured to the grooved element at the ungrooved surface of said element around the aperture, and also at the periphery of such perforated sheet metal.

4. A filtering-plate for a filter-press, comprising a back or central element superficially channeled or grooved and having an aperture for supplying the material to be filtered within the periphery of such channeled or grooved portion; and a surface covering constituting the sole filtering element, consisting of a perforated sheet-metal plate applied over the grooved surface of the back or central element forming the outer surface of the plate; and suitable means for binding such sheet-metal plate to the grooved element beyond the ends of the grooves.

5. A filtering-plate for a filter-press, comprising a back or central element having vertical parallel channels or grooves in its surface, and means for draining the same; and a surface covering, constituting the filtering element, of a strip or band of perforated sheet metal, extending across the vertical grooves in the middle portion of the height of the plate, and an imperforate surface covering for the upper and lower portions of the grooved plate; and suitable means for binding both the perforated and the imperforate coverings to the grooved plate at their margins respectively.

6. A filtering-plate for a filter-press, comprising a back or central element superficially channeled or grooved, and a surface covering for the same, constituting the filtering element, consisting of sheet metal perforated with elongated slots, the same being applied to the grooved plate with the length of slots horizontal.

7. A filtering-plate for a filter-press, comprising a back or central element having vertical parallel channels or grooves and suitable means for draining the same at the lower end; and a surface covering for the same, constituting the filtering element, consisting of perforated sheet metal whose perforations are extended or elongated in a direction transverse to the grooves in the back element.

In testimony whereof I have hereunto set my hand, at Vincennes, Indiana, in the presence of two witnesses, this 7th day of July, A. D. 1900.

HARRY F. CLEVELAND.

Attest:
F. F. BAKER,
T. P. LAIN.